W. S. WILEY.
COMBINATION TRACTOR AND PLOW.
APPLICATION FILED FEB. 1, 1912.
1,057,472.
Patented Apr. 1, 1913.
3 SHEETS—SHEET 1.
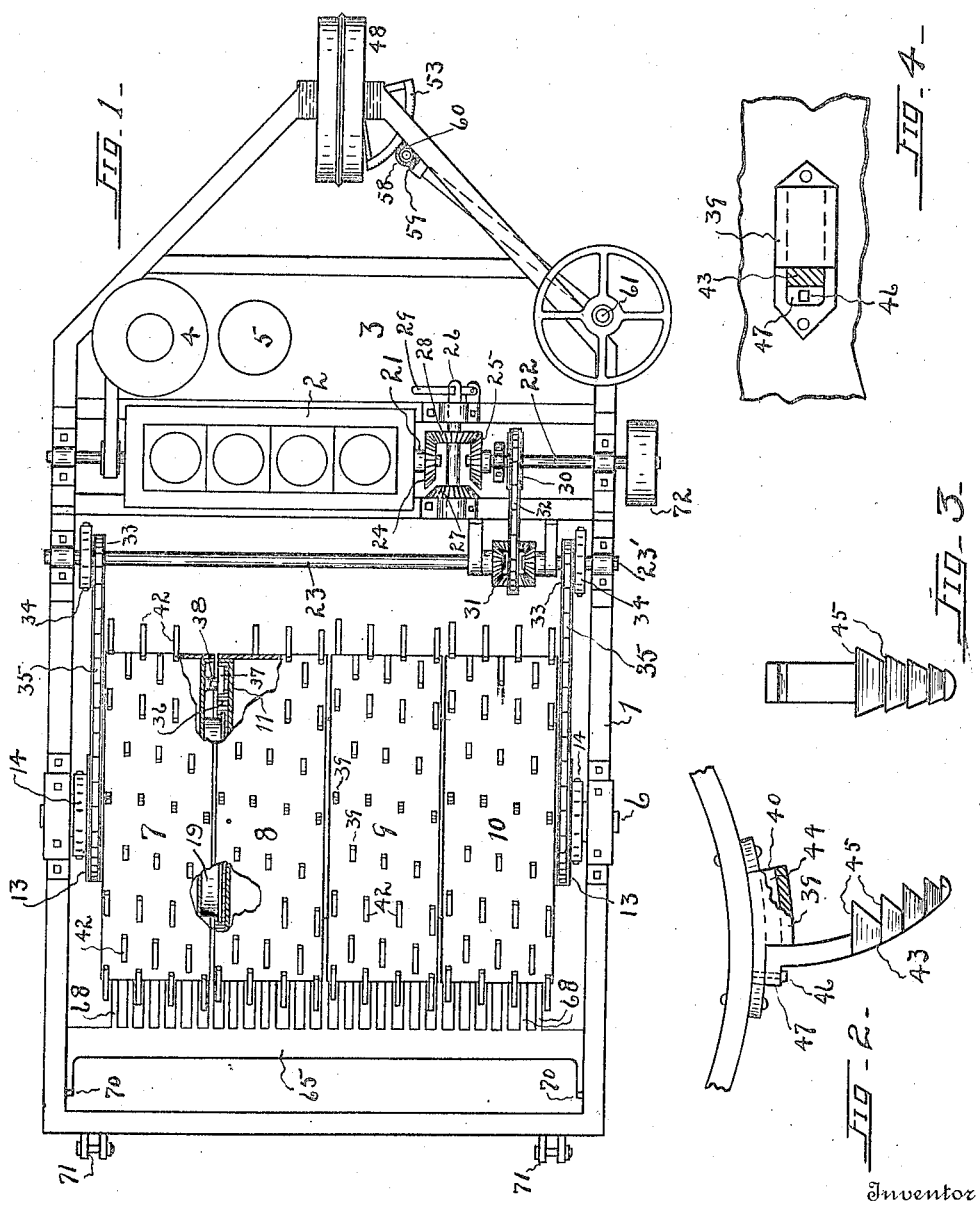
Witnesses
R. E. Borkenhagen
A. R. Mitchell
Inventor
Walter S. Wiley,
By Hiram A. Sturges,
Attorney

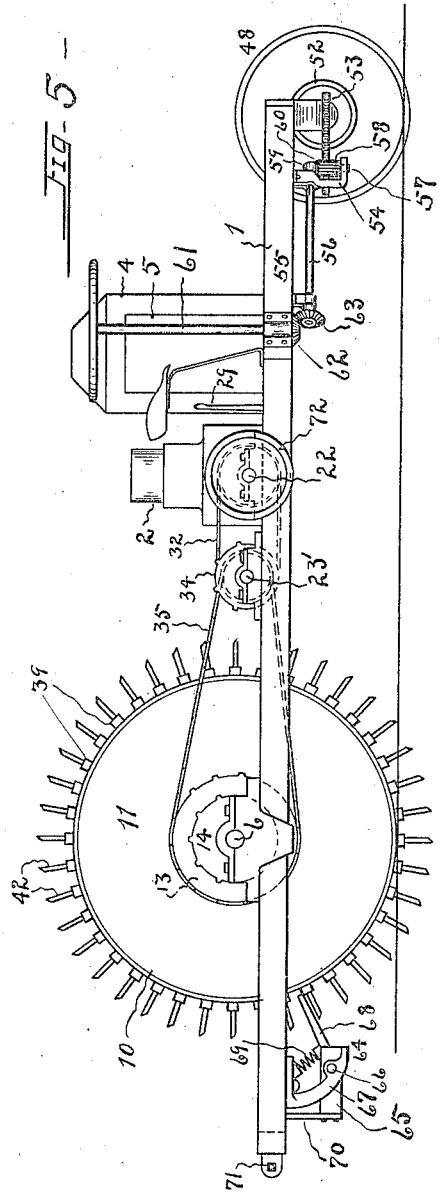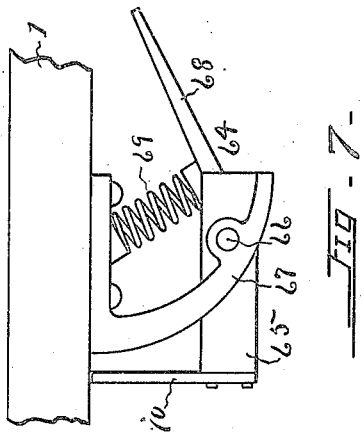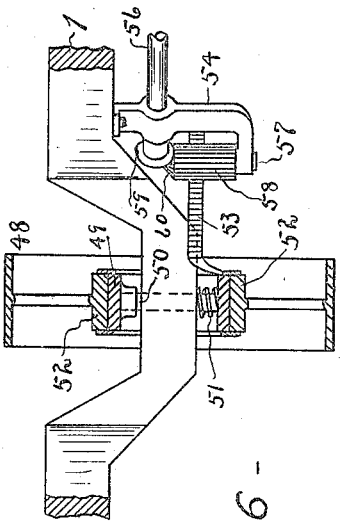

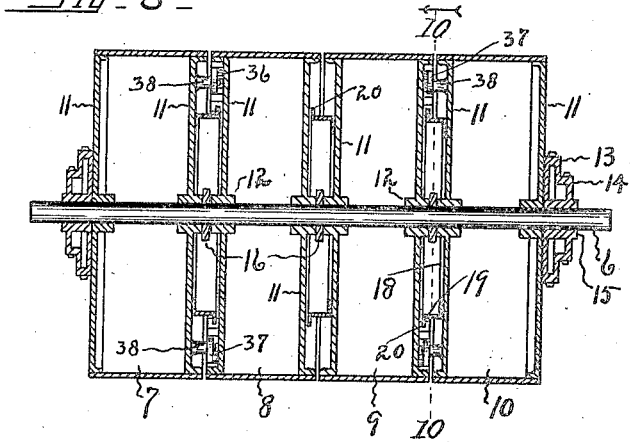
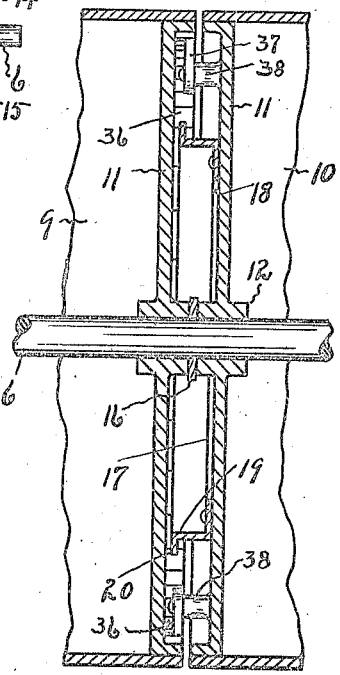
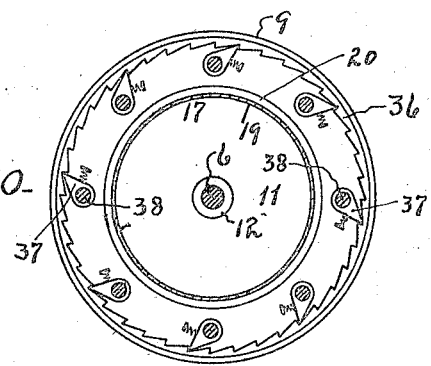
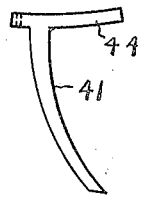
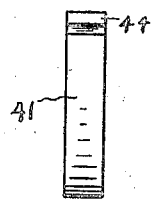
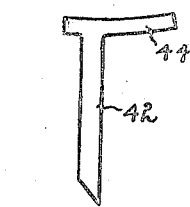

UNITED STATES PATENT OFFICE.

WALTER S. WILEY, OF OMAHA, NEBRASKA.

COMBINATION TRACTOR AND PLOW.

1,057,472.

Specification of Letters Patent.     Patented Apr. 1, 1913.

Application filed February 1, 1912. Serial No. 674,768.

*To all whom it may concern:*

Be it known that I, WALTER S. WILEY, a citizen of the United States, residing at Omaha, in the county of Douglas and State of Nebraska, have invented certain new and useful Improvements in Combination Tractors and Plows, of which the following is a specification.

This invention relates to a combination tractor and plow, being a machine, implement or vehicle driven by an engine and adapted for the use of farmers for plowing or drawing heavy loads, and to be of a plain or simple construction so that it may be manufactured at a moderate expense, comparatively.

The invention has especial reference to the employment of a plurality of traction wheels which may be mounted end-to-end upon a single shaft or axle, said wheels being rotatable to propel the vehicle, and their rotation as compared with each other, being permitted to be at different degrees of speed so that the vehicle may be moved at right angles or acute angles from a direct line of travel, and will admit moving upon long curves, short curves or forwardly, these features being particularly useful when the implement is used for plowing, to turn at the end of a furrow, when moving on parallel lines in the plowing of a field.

The invention includes the use of spader-cylinders or traction wheels provided with pawls and ratchets so arranged that one wheel which is positively rotated, may cause an adjacent wheel to be rotated in the same direction and at the same speed, and will also provide for a rearward movement, at a lesser degree of speed, of one wheel than the rearward movement of the wheel which is positively rotated and with which it is connected, these features being quite necessary when the machine is used for plowing, in order to turn directly about at the end of a field when forming parallel furrows.

The invention also discloses a convenient means for changing the speed of the wheels without changing the rotatable movement of the engine shaft; the use of dust-guards between the wheels found useful to protect the bearings of said wheels; the use of a resiliently mounted comb for cleaning the plow teeth; permanent friction-lugs upon the peripheries of the wheels for the use of the implement as a tractor and providing removable mountings for the plow teeth when used as a plow; convenient means under control of an operator for steering, and the employment of means for positively driving the end-wheels of the series of traction wheels at different degrees of speed.

The invention consists of the novel construction, combination and arrangement of parts as described herein and claimed, and as illustrated in the drawing, it being understood that changes in form, size, proportion and minor details may be made within the scope of the claims without departing from the spirit of the invention or sacrificing any of its advantages.

In the drawing, Figure 1, is a partly broken, plan view of a combination tractor and plow embodying my invention. Fig. 2 is a side view of a curved plow-tooth removably mounted in a housing or friction-lug, a part of a wheel tire being shown, the lug being broken and partly in section. Fig. 3 is a front view of the tooth shown in Fig. 2. Fig. 4 is a plan view of a friction-lug and a part of a wheel tire, the body of a tooth being shown in section. Fig. 5 is a side view of the combination tractor and plow shown in Fig. 1. Fig. 6 is a rear view of the single, front wheel, and steering devices connected therewith, the wheel being in section. Fig. 7 is an enlarged detail, showing the end of the comb and its mounting. Fig. 8 is a sectional view through the middle of the traction wheels, the teeth and friction-lugs being omitted. Fig. 9 is an enlarged detail, partly broken, to clearly show construction of two connected wheels. Fig. 10 is a sectional view on line $a$ $a$ of Fig. 8. Figs. 11 and 12 are side and front views, respectively, of curved plow-teeth or harrow-teeth. Figs. 13 and 14 are side and front views, respectively, of straight plow-teeth or harrow-teeth.

Referring now to the drawing for a more particular description, numeral 1 indicates a frame, preferably of rectangular form, and of any suitable length and width; and preferably it is formed with a tapered or convergent front part, but this is not important. The frame may be provided with suitable cross-bars for the support thereon of an engine 2, and a platform 3 upon which may be supported a radiator 4 and a gasolene-tank 5.

Disposed transversely of the vehicle and having suitable bearings upon the side members of the frame, is the shaft or axle 6; and mounted to rotate thereon are a plurality of wheels adapted for use as traction-members or for rotary plow-members, and for convenience, they are indicated at 7, 8, 9 and 10. The length of the axle will depend upon the width of the wheel tires or the number of wheels to be mounted thereon. While I have shown four of these wheels, a greater or lesser number may be employed as may be desired.

As best shown in Fig. 8 each wheel is provided at its ends with a circular web 11 having at its middle a hub or sleeve 12 for a bearing upon the axle. Secured in any suitable manner upon the outer ends of wheels 7 and 10, and having a uniform diameter, are sprocket wheels 13, and having a less diameter and secured outwardly of wheels 13 are sprocket wheels 14, these sprocket wheels having a sleeve 15 for bearings upon the axle. Washers or spacing-members 16 are also provided and are disposed between the ends of the adjacent wheels, to prevent a contact of one wheel tire with another.

Between each of the wheels is provided a dust-guard 17, best shown in Fig. 9, each consisting of a circular rim 18 of less diameter which may be secured upon a web of one of the wheels, said rim having an annular, transverse flange 19 extending toward the web of an adjacent wheel and provided with an outwardly projecting terminal rim 20; and soil, pebbles or the like, which may be carried upwardly by the wheels when plowing, or when used as a tractor, and which may pass between the tires of the wheels, will be caught upon these guards, and the bearings of the wheels upon the axle will therefore be protected.

Means are provided and now to be described for causing a rotatable movement of wheels 7 and 10 at uniform or different degrees of speed. The engine shaft is indicated at 21. At 22 is indicated an intermediate shaft; and at 23 and 23', disposed in alinement, are indicated operating shafts, all of said shafts being disposed parallel with the axle.

A clutch is provided to operate between the engine shaft and shaft 22. The operating pinion of the engine shaft is indicated at 24. Shaft 22 is provided with a pinion 25; between these pinions, in suitable bearings and disposed at right angles to these shafts, is a shaft 26 upon which is mounted the two adjacent pinions 27 and 28. A hand-lever is indicated at 29, and by use of this lever, shaft 26 may have a sliding movement to cause engagement of either one of pinions 27 or 28, as may be desired, with the pinion of the engine shaft and with the pinion of shaft 22, for causing its rotation.

Shaft 22 is provided with the sprocket wheel 30. Shafts 23 and 23' at their inner ends are connected by the differential gear 31; and extending between and connected with the differential gear and the sprocket wheel of shaft 22, is sprocket chain 32.

Each of shafts 23 and 23' is provided with sprocket wheels 33 and 34. Sprocket wheels 33 are of the same diameter, as compared with each other, and of less diameter than wheels 34. They are disposed in alinement with the sprocket wheels of greater diameter of traction wheels 7 and 10; and sprocket wheels 34 are disposed in alinement with the sprocket wheels of lesser diameter of said traction wheels.

At 35 are indicated sprocket chains adapted to cause a rotation of traction wheels 7 and 10, by the rotation of shafts 23 and 23', these chains extending between and connecting sprocket wheels 33 with sprocket wheels 13; and it will be understood that if chains 35 are removed, and if sprocket wheels 34 and 14 are connected by sprocket chains (not shown), the comparative degree of speed for traction wheels 7 and 10 will be decreased without changing the speed of the engine. This change of speed is often desirable. During operation, when plow teeth of considerable length are employed, it is obvious that the resistance to their swinging movements while embedded in the ground is greater than when shorter teeth are used, and at this time the vehicle should move slower. This may be accomplished without changing the speed of the engine if chain 35 connects sprocket wheels 13 and 33, as shown in Fig. 1. Also if the ground is hard or compact, the wheels 7, 8, 9 and 10 should have a less degree of rotation than when plowing in light soil. When the device is used as a tractor, a greater speed may be desired, and for this purpose, without changing the speed of the engine, sprocket chain 35 may be removed, and by use of sprocket chains each of sprocket wheels 14 may be connected with a sprocket wheel 34, with the result that wheels 7 to 10 inclusive will have, comparatively, a greater degree of rotation.

As best shown in Fig. 10 an internal circular rack 36 may be employed for the traction wheels. When a series of four traction wheels are employed, as illustrated in the drawings, an internal rack 36 is provided for wheels 8 and 9, these wheels being mounted as idlers upon shaft 6. At 37 are indicated pawls adapted to normally engage the teeth of the racks, the pawls being pivotally mounted upon projections or bosses 38 having mountings upon the driven wheels 7 and 10. By this arrangement, a forward rotatable movement of wheels 7 and 10 will cause wheels 8 and 9 to have a like rotatable movement and at the same degree of speed as said wheels 7 and 10. In the operation of plowing where all of the furrows are formed parallel, it is desirable and quite necessary, at the end of the field to cause a movement of the tractor upon a sharp curve, and in describing this movement the outer wheel, as for instance wheel 10, will move forwardly and the inner wheel 7 will move rearwardly, and on account of the operation of the ratchet and pawl, as described, wheel 8 in its rearward movement will not move at the same degree of speed as the driven wheel with which it is connected, and therefore the operation of moving upon short curves is facilitated. And if the machine is moved to describe a short curve in the opposite direction to that described the parts operate with the same effect or advantage.

While I have described and prefer to employ the pawls and ratchets mentioned, I do not limit myself in this respect, for a plurality of wheel members provided with rotatable means and mounted upon a single shaft, whether used as a tractor or as a plow, has many advantages, as compared with a single wheel for these purposes.

At 39 are indicated friction lugs, and preferably they are disposed upon each tire in rows diagonal to the longitudinal axis of the wheel and secured rigidly or permanently thereon, said lugs also forming rows which are continuous and disposed at right angles to said longitudinal axis of the wheel.

The friction lugs may be of any desired size or proportion required to prevent skidding of the wheels, when the implement is used as a tractor. The lugs may be provided with longitudinal apertures 40; and when they are mounted upon the tires, the apertures 40 extend in the direction and may conform to the curvature of the tires.

At 41, 42 and 43 are indicated teeth which may be employed, all having angular terminals, bases or holder-members 44 of uniform size and shape for insertion within apertures 40 of the lugs. Teeth 41 have curved body-portions, while the body-portions of teeth 42 are straight. Teeth 43 are particularly useful for plowing to a considerable depth where the soil is loose or sandy, and are useful in the practice of "dry farming" or the utilization of land in localities where the soil is comparatively dry, the transverse ledges 45 of these teeth tending to move the sub-soil upwardly to advantage.

In operation, the teeth enter the ground with comparatively a slight resistance at the front of the wheels, and the soil is thrown upwardly at the rear. Each angular terminal or holder 44, since it is disposed forwardly of the tooth body, provides a strong construction for resisting the strain imposed upon the tooth at the time it moves upwardly at the rear of the wheels, and the friction-members provide a strong holding means for the mounting of the teeth. At 46 are indicated set-screws. The angular holder 44 of each tooth is provided with a rearward projection or heel 47. By means of the set-screws traversing these projections, the teeth, or any of them, may be removably secured to the lugs, and in practice, the teeth may be conveniently removed from the lugs when it is desired to use the implement as a tractor.

Any convenient means may be employed for steering. Preferably I employ the single front wheel 48, best shown in Fig. 6. At 49 is indicated a cylindrical plate or support provided at its middle with a king pin 50 for a seating, vertically, in an aperture (not shown) formed in the front end of the machine frame; and mounted upon the lower end of pin 50 is a spring 51.

Mounted upon the cylindrical supporting-plate 49 is the sleeve or hub 52 of wheel 48, and the wheel may therefore freely rotate, the bearings for its hub or sleeve being the cylindrical support 49. If a lateral swinging movement is provided for support 49, the wheel may have a corresponding movement.

Rigidly mounted upon the lower part of the cylindrical supporting-plate is the segmental rack 53. At 54 and 55 are indicated brackets disposed below and mounted upon the frame to provide bearings for a shaft 56. Bracket 54 provides a mounting for a vertical stub-shaft 57 upon which is mounted a spool pinion 58 for engagement with the segmental rack, and upon the terminal of shaft 56 is mounted a miter gear 59 for engagement with a miter gear 60 formed upon the upper end of pinion 58.

At 61 is indicated a steering shaft, and under control of the operator the machine may be guided in a well known manner, gear 62 of shaft 61 being in engagement with a gear 63 of shaft 56. And when moving over obstructions or uneven surfaces, the spring 51 will tend to prevent vibrations.

When using the machine for plowing fields of stubble or when working in damp ground, the soil, or grass-roots may be carried upwardly upon the plow-teeth, and in order that the teeth may become free from these obstructions and may be cleaned, I provide the cleaning device or pulverizer 64 best shown in Figs. 1 and 7.

The cleaner or pulverizer consists of a plate 65 disposed parallel with the axle rearwardly of the traction wheels, said plate having pivots 66 on its ends mounted in brackets 67, these brackets being mounted upon and preferably disposed below the frame. The plate is provided with forwardly-projecting teeth 68 adapted to engage between the continuous rows of teeth of the traction wheels, and preferably the teeth are inclined upwardly from plate 65. This plate and teeth therefore provide a device of comb-shape operating in a practical way to dislodge obstructions or adhesions from the teeth as they move upwardly. To prevent breakage of the teeth incident to their use when large obstructions are encountered, spiral springs 69 are provided, the upper and lower ends of said springs, respectively, bearing upon brackets 67 and upon the plate near its front edge.

The plate is provided at its ends upon its rear edge with upright arms or braces 70 adapted, normally, to bear upon the lower side of the machine frame, on account of the downward pressure of the springs upon the plate. When a large obstruction is carried upwardly upon the teeth, springs 69 operate to resist, with a considerable force, an upward swinging movement of the comb or cleaner, but the force of the springs being overcome, they may be compressed to allow the obstruction to pass upwardly.

Numerals 71 indicate staples or holders secured upon the rear end of the frame for securing thereto any heavy object to be drawn, and numeral 72 indicates a pulley mounted upon the free end of shaft 22, this pulley being useful for many purposes, when the implement is used stationary, and after sprocket chain 32 has been removed.

It may be stated that the series of wheels disposed end-to-end provide a tractor of greater width than could conveniently be provided by any other construction, this feature being of advantage while passing over soft ground or wet soil. The parts may therefore have a light weight, comparatively, and still provide the required frictional resistance while moving, by reason of the considerable surface or area of ground which it covers.

Having fully described my invention, what I claim and desire to secure by Letters Patent is,—

1. An implement for the purpose described, comprising, in combination with an axle; rotatable tractor wheels mounted thereon, each being provided with pawls; and idler tractor wheels upon the axle, each being disposed adjacent to and having an annular rack normally engaged by the pawls of a rotatable tractor wheel.

2. An implement for the purpose described, comprising, in combination with an axle; a pair of rotatable tractor wheels mounted thereon, each being provided upon one of its sides with pawls; a pair of idler tractor wheels upon the axle, each being disposed adjacent to and having an annular rack normally engaged by the pawls of a rotatable tractor wheel, the operation being that a forward movement of either of the rotatable tractor wheels will cause a movement in unison therewith of the idler tractor wheel with which it is engaged, a rearward movement of the rotatable tractor wheels permitting a forward rotatable movement of said idler tractor wheels.

3. An implement for the purpose described, comprising, in combination with an axle, rotatable tractor wheels mounted thereon; idler tractor wheels upon the axle, each being disposed adjacent to a rotatable tractor wheel; coöperating devices arranged to connect each rotatable tractor wheel and an idler tractor wheel for causing each idler tractor wheel to be rotated forwardly at the same speed as the rotatable tractor wheel with which it is connected during the forward movement of the rotatable tractor wheels, said devices permitting a forward rotatable movement of the idler tractor wheels during a rearward movement of said rotatable tractor wheels.

4. An implement for the purpose described, comprising, in combination with an axle, rotatable tractor wheels mounted thereon; idler tractor wheels upon the axle, each being disposed adjacent to a rotatable tractor wheel; and a plurality of pawls and a ratchet arranged to coöperate between each rotatable tractor wheel and an idler tractor wheel for causing a positive rotatable movement in one direction of the idler tractor wheels from the movements of the rotatable tractor wheels when moving in the same direction.

5. An implement for the purpose described, comprising, in combination with an axle, rotatable spader cylinders provided with circular webs with sleeves, said sleeves providing bearings upon the axle while the cylinders are disposed end-to-end; spacing-members upon the axle between the sleeves for preventing a contact of one cylinder with another; and a plurality of dust-guards, each having a transverse flange mounted upon the web of one cylinder and disposed in the plane of an adjacent cylinder to circumscribe the spacing-members.

6. An implement of the class described, comprising, in combination with an axle, a rotatable differential gear, an operating shaft driven by the differential gear; end spader-cylinders having bearings upon the axle and adapted to be rotated by the operating shaft; idler spader-cylinders disposed upon the axle, each being disposed adjacent to an end spader-cylinder; a plurality of pawls and ratchets arranged to coöperate between the end spader-cylinders and the idler spader-cylinders for controlling one of the movements of said idler spader-cylinders; and means to change the speed of the end spader-cylinders without changing the speed of the operating shaft.

7. An implement for the purpose described, comprising, in combination with an axle, a revoluble transmission gear, an operating shaft driven by the transmission gear; end spader-cylinders mounted upon the axle and provided with pawls, and adapted to be rotated by the operating shaft; idler spader-cylinders upon the axle, each being disposed adjacent to and having an annular rack normally engaged by the pawls of an end spader-cylinder; and means to change the speed of the end spader-cylinders without changing the speed of the operating shaft.

In testimony whereof I have affixed my signature in presence of two witnesses.

WALTER S. WILEY.

Witnesses:
  HIRAM A. STURGES,
  A. F. CLARK.